United States Patent [19]
Takahashi et al.

[11] 3,932,706
[45] Jan. 13, 1976

[54] SIGNAL SYNTHESIZING SYSTEM ADAPTABLE FOR DISCRETE FOUR-CHANNEL SOUND REPRODUCING SYSTEM AND MATRIX FOUR-CHANNEL SOUND REPRODUCING SYSTEM

[75] Inventors: Susumu Takahashi; Ryosuke Ito, both of Tokyo, Japan

[73] Assignee: Sansui Electric Co., Ltd., Tokyo, Japan

[22] Filed: May 25, 1973

[21] Appl. No.: 364,115

[30] Foreign Application Priority Data
May 31, 1972 Japan.............................. 47-53951

[52] U.S. Cl.................... 179/1 GQ; 179/100.1 TD; 179/100.4 ST
[51] Int. Cl.².......................................... H04R 5/00
[58] Field of Search............... 179/1 G, 1 GQ, 1 GP, 100.4 ST, 179/100.1 TD

[56] References Cited
UNITED STATES PATENTS
3,761,628  9/1973  Bauer............................. 179/1 GQ OTHER PUBLICATIONS
Why The Four Channel War Need Not Take Place by Feldman, Audio Magazine, July 1972.

*Primary Examiner*—Douglas W. Olms
*Attorney, Agent, or Firm*—Harris, Kern, Wallen & Tinsley

[57] ABSTRACT

The invention discloses a system for synthesizing first and second recording or transmission signals adaptable for both of a discrete four-channel stereo sound reproducing system and a matrix four-channel stereo sound reproducing system. The first recording or transmission signal includes a first audio main signal and a first carrier signal frequency modulated by a first audio sub-signal, whereas the second recording or transmission signal includes a second audio main signal and a second carrier signal frequency modulated by a second audio sub-signal. Each of the first and second audio main signals is formed by combining four sound signals with a predetermined amplitude ratio and a predetermined phase relationship, whereas each of the first and second sub-signals is formed by combining three of the four sound signals with a predetermined amplitude ratio and a predetermined phase relationship. The first and second main signals are used to effect the matrix four-channel sound reproduction, while a combination of the first and second main signals and the first and second sub-signals is used to effect the discrete four-channel sound reproduction.

5 Claims, 16 Drawing Figures

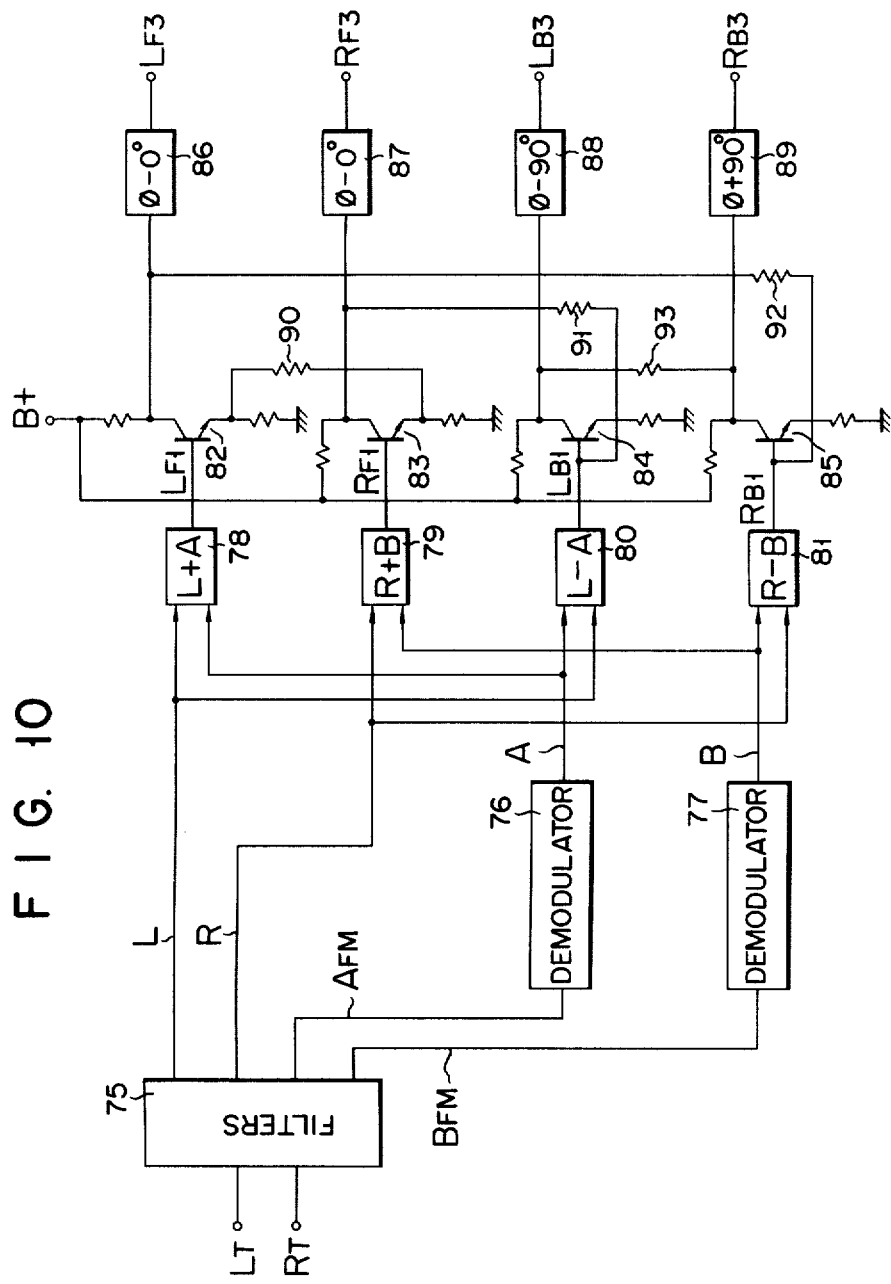
F I G. 10

SIGNAL SYNTHESIZING SYSTEM ADAPTABLE FOR DISCRETE FOUR-CHANNEL SOUND REPRODUCING SYSTEM AND MATRIX FOUR-CHANNEL SOUND REPRODUCING SYSTEM

This invention relates to a four-channel stereo system that can be used for both of a discrete four-channel system and a matrix four-channel system.

Various types of four-channel stereo systems have been developed recently. At present a discrete four-channel system and a matrix four-channel system are used most widely. However, these two systems are not compatible. In other words, stereo phonograph records recorded by the discrete four-channel system can not be used for the four-channel reproduction with a matrix four-channel reproducing system. On the other hand, stereo phonograph records recorded by the matrix four-channel system can not be used for the four-channel reproduction with a discrete four-channel reproducing system. This is because signals utilized in these systems have different signal compositions. For this reason, in order to provide a four-channel reproduction of such stereo records, it is necessary to use different reproducing systems or decoders for the different four-channel systems.

When recording sound signals on a stereo phonograph record with the discrete four-channel system, if the same signal exists concurrently on the four-channels the grooves of the phonograph record will be over-cut in the direction of the surface of the record. Such over-cutting causes an adverse effect on the carrier signals thereby making it difficult to reproduce four-channel signals at high fidelities.

It is therefore an object of this invention to provide a signal synthesizing systemm which can be used with equal efficacies in both of the discrete four-channel system and the matrix four-channel system.

Another object of this invention is to provide a sound recording method capable of decreasing an over-cutting due to audio signal components which affects carrier components, when recording on a stereo phonographic record the audio signal components and carrier signal components which are frequency modulated by the audio signals and having frequencies above audible frequencies.

According to one aspect of this invention there is provided a signal synthesizing system for forming first and second recording or transmission signals from first to fourth sound signals, the first and second recording or transmission signals being usable for four-channel stereo sound reproducing systems of different type, said system comprising first means for combining a first sound signal, a portion of a second sound signal, a third sound signal and a portion of a fourth sound signal with a predetermined phase relationship therebetween to form a first main signal; second means for combining a portion of the first sound signal, the second sound signal, a portion of the third sound signal and the fourth sound signal with a predetermined phase relationship therebetween to form a second main signal; third means for combining the first sound signal, the third sound signal and a portion of the fourth sound signal with a predetermined phase relationship therebetween to form a first sub-signal; fourth means for combining the second sound signal, a portion of the third sound signal and the fourth sound signal with a predetermined phase relationship therebetween to form a second sub-signal; fifth means for performing frequency modulation of a first carrier signal in accordance with the first sub-signal, sixth means for performing frequency modulation of a second carrier signal in accordance with the second sub-signal; means for adding the first main signal and the frequency modulated first carrier signal to form the first recording or transmission signal; and means for adding the second main signal and the frequency modulated second carrier signal to form the second recording or transmission signal.

According to another aspect of this invention there is provided a method of recording first and second recording signals which can be used for different types of four-channel stereo sound reproducing systems on the first and second channels of a two-channel stereo sound recording medium, said method comprising the steps of combining a first sound signal, a portion of a second sound signal, a third sound signal and a portion of a fourth sound signal with a predetermined phase relationship therebetween to form a first main signal; combining the first sound signal, the third sound signal and a portion of the fourth sound signal with a predetermined phase relationship therebetween to form a first sub-signal, frequency modulating a first carrier signal with the first sub-signal; recording the first main signal and the frequency modulated first carrier signal on the first channel; combining a portion of the first sound signal, the second sound signal, a portion of the third sound signal and the fourth sound signal with a predetermined phase relationship therebetween to form a second main signal; combining the second sound signal, a portion of the third sound signal and the fourth sound signal with a predetermined phase relationship therebetween to form a second sub-signal; frequency modulating a second carrier signal with the second sub-signal; and recording the second main signal and the frequency modulated second carrier signal on the second channel.

This invention can be more fully understood from the following detailed description when taken in connection with reference to the accompanying drawings, in which:

FIG. 10 is a block diagram of a discrete four-channel sound reproducing system embodying the invention.

To have a better understanding of the invention conventional discrete four-channel sound recording and reproducing systems and conventional matrix four-channel sound recording and reproducing systems will first be described.

Figure 1:
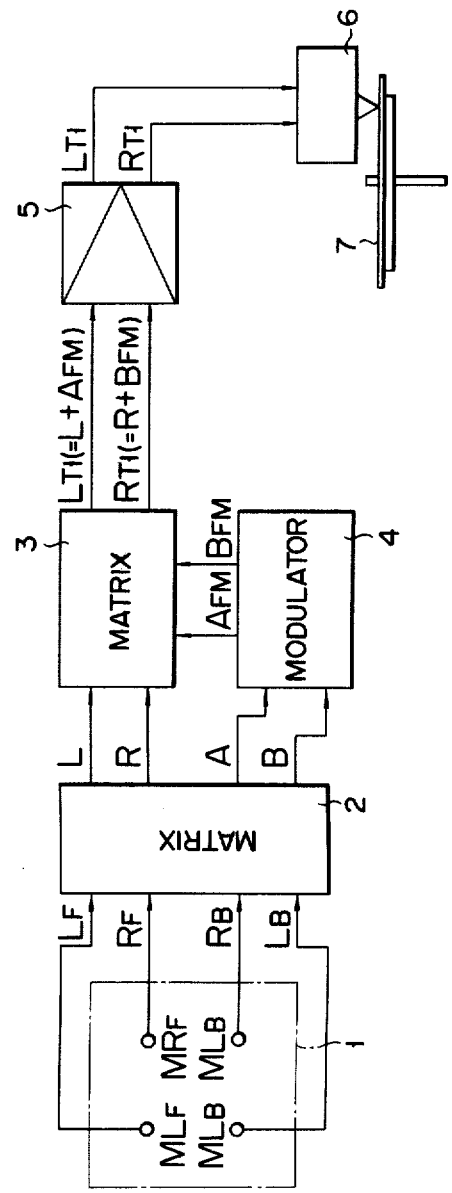
FIG. 1 is a block diagram showing a discrete four-channel sound recording system.

A discrete four-channel sound recording system diagrammatically shown in FIG. 1 comprises four microphones MLF, MRF, MLB and MRB, for example, which are located in a sound field 1, and a matrix circuit 2 for effecting the matrix conversion of the first to fourth sound signals LF, RF, RB and LB picked-up by respective microphones to produce first and second main signals L and R, and first and second sub-signals A and B, respectively. The sub-signals A and B are sent to a modulator 4 to effect the frequency modulation of first and second carrier signals, respectively, which have frequencies within a frequency range of from 30 kHz to 35 kHz. The first and second carrier signals AFM and BFM frequency modulated in this manner are applied to a matrix circuit 3 or an adder together with the first and second main signals L and R for producing first and second recording signals LT and RT. These recording signals are amplified by an amplifier 5 and the output thereof is applied to a well known sound groove cutter 6 which is used to cut sound grooves on the surface of a lacquer disc 7. Accordingly, sound signals having a frequency of from 20 Hz to 15 kHz and carrier signals frequency modulated by sound signals having frequencies of from 20 kHz to 45 kHz are recorded on the lacquer disc 7.

The first and second main signals L and R and the first and second sub-signals A and B which are produced by the matrix circuit 2 and the first and second recording signals LT1 and RT1 which are produced by the matrix circuit 3 are expressed by the following equations, respectively.

$$
\begin{aligned}
L &= LF + LB \\
R &= RF + RB \\
A &= LF - LB \\
B &= RF - RB \\
LT1 &= L + AFM \text{ and} \\
RT1 &= R + BFM
\end{aligned}
\quad (1)
$$

In order to reproduce sound signals from a stereo phonographic record which has been recorded with four-channel sound signals in a manner described above, a reproducing system shown in FIG. 2 is used. Thus, the first and second signals LT1 and RT1 reproduced from a stereo phonographic record by means of a cartridge 8 are supplied to a lowpass filter 10 and a bandpass filter 12 via an equalizer 9 to obtain the first and second main signals L and R and the first and second frequency modulated carrier signals AFM and BFM. These carrier signals are supplied to a demodulator 13 to obtain first and second sub-signals A and B. The first and second main signals L and R and the first and second sub-signals A and B are converted into four signals RF1, LF1, LB1 and RB1 by the operation of a matrix circuit 11. These signals RF1, LF1, LB1 and RB1 are supplied to loudspeakers SRF, SLF, SLB and SRB, respectively, which are disposed about a listener 15. The reproduced signals LF1, RF1, LB1 and RB1 are expressed by the following equations, respectively.

$$
\begin{aligned}
LF1 &= L + A = (LF+LB) + (LF-LB) = 2LF \\
RF1 &= R + B = (RF+RB) + (RF-RB) = 2RF \\
LB1 &= L - A = (LF+LB) - (LF-LB) = 2LB \\
RB1 &= R - B = (RF+RB) - (RF-RB) = 2RB
\end{aligned}
\quad (2)
$$

As can be noted from these equations, the discrete four-channel system is characterized in that the separations between respective channels are substantially infinity.

Figure 5:
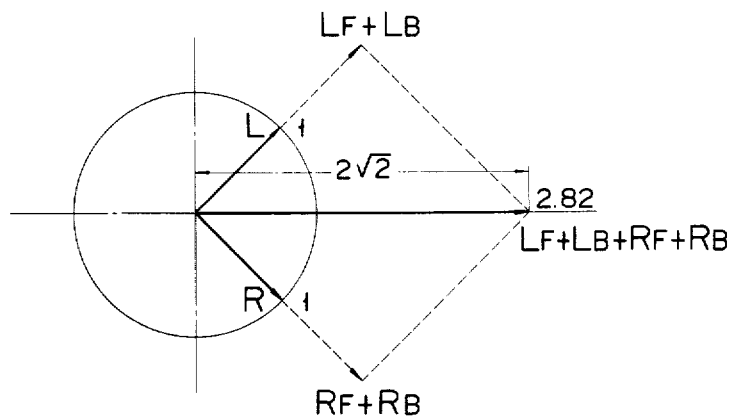
FIG. 5 is a cutting vector diagram in case of the discrete four-channel system when the same signal exists in the four channels.

However, in the discrete four-channel system, the main signal L of the left channel is equal to the sum of the left-front signal LF and the left-back signal LB whereas the main signal R of the right channel is equal to the sum of the right-front signal RF and the right-back signal RB so that where the same signal exists concurrently in the four channels, the amplitudes of the left channel signal L and the right channel signal R are doubled, respectively as shown in FIG. 5. Accordingly, it will be noted that the amplitude of the signal in the horizontal direction of the phonographic record will be increased by a factor of about $2\sqrt{2}$ (+9 dB) when compared with a single channel input, thus resulting in an over-cutting of the sound groove. Such over-cutting causes an undesirable dropout of the carrier signal components at the time of reproduction and the introduction of the harmonic distortion components of the main signals caused by a pinch effect and the like into the carrier signal components.

Figure 3:
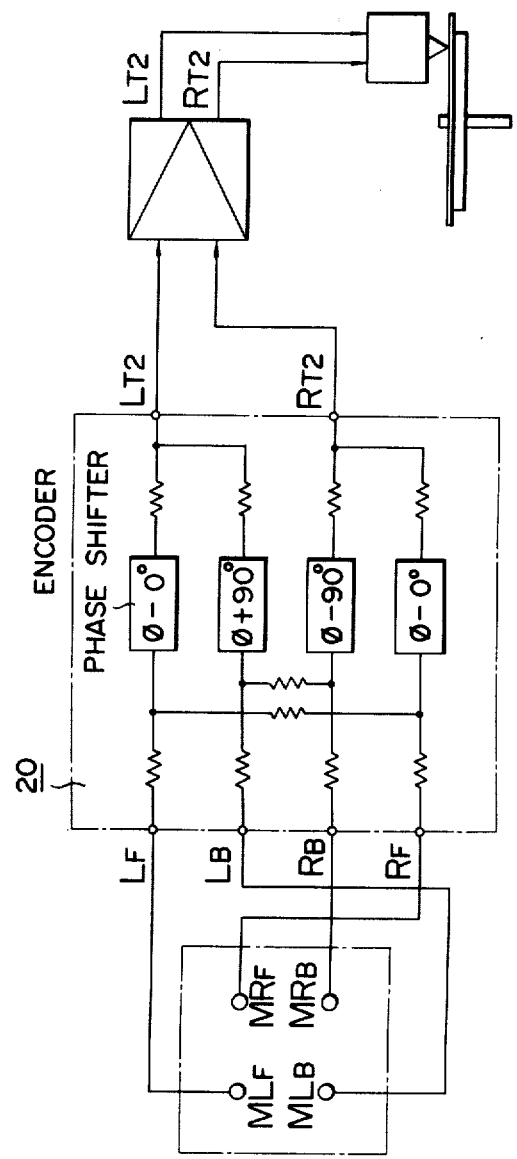
FIG. 3 is a block diagram showing a matrix four-channel sound recording system.

In the case of the matrix four-channel system, as can be noted from its sound recording system shown in FIG. 3, the sound signals LF, LB, RB and RF are converted into first and second recording signals LT2 and RT2 which are expressed by the following equations by the operation of an encoder 20 of the well known construction.

$$
\begin{aligned}
LT2 &= LF + \Delta RF + jLB + J\Delta RB \\
RT2 &= RF + \Delta LF - jRB - j\Delta LB
\end{aligned}
\quad (3)
$$

where $\Delta$ is a matrix coefficient equal to about 0.4.

The signals LT2 and RT2 reproduced from a matrix phonographic record are converted into four outputs expressed by the following equations respectively by the operation of a decoder 40 including a well known matrix circuit 41 and phase shifters 42, 43, 44 and 45.

$$
\begin{aligned}
LF2 &= LT2 + \Delta RT2 \\
RF2 &= RT2 + \Delta LT2 \\
LB2 &= -j(LT2 - \Delta RT2) \\
RB2 &= j(RT2 - \Delta LT2)
\end{aligned}
\quad (4)
$$

Thus in the matrix four-channel system, the four-channel reproduced signals are obtained by adding the left-signal LT2 and the right-signal RT2 at a predetermined amplitude ratio and by subtracting the left and right signals at a predetermined amplitude ratio.

Figure 6:
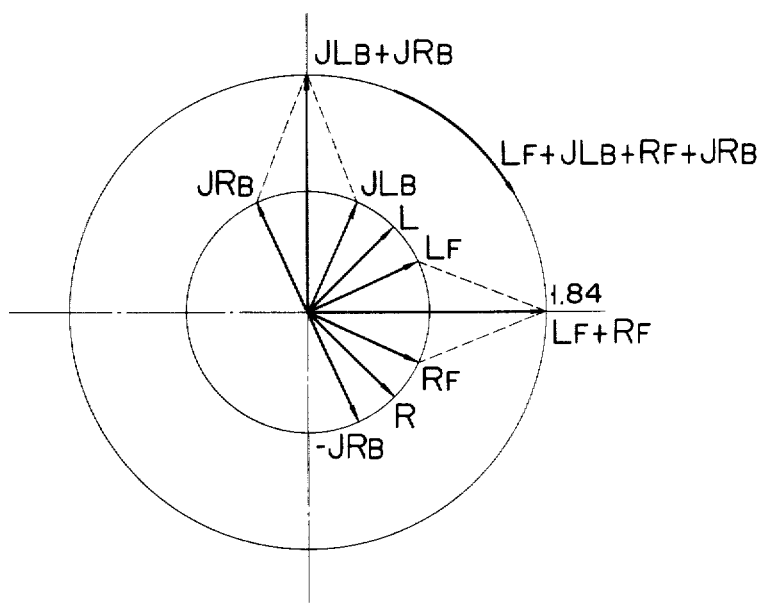
FIG. 6 is a cutting vector diagram in case of the matrix four-channel system when the same signal exists in the four channels.
Figure 7A:
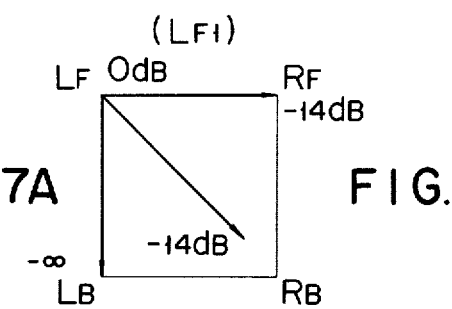
FIGS. 7A to 7D are diagrams showing separation characteristics between respective output channels of a conventional discrete four-channel sound reproducing system when the sound signal synthesizing system of the invention is used.
Figure 7B:
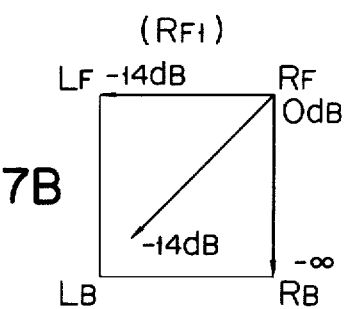
Figure 7C:
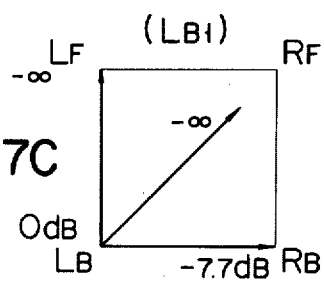
Figure 7D:
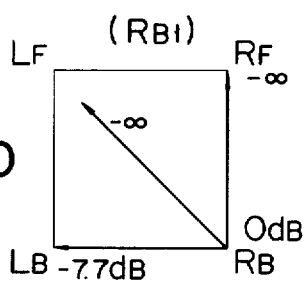
Figure 8A:
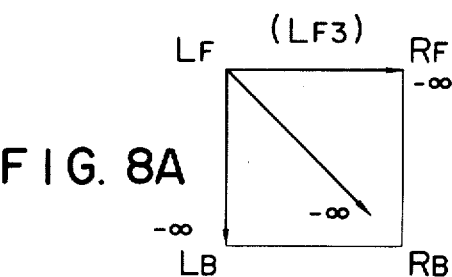
FIGS. 8A to 8D are diagrams showing separation characteristics between respective output channels of a discrete four-channel sound reproducing system adapted for the sound signal synthesizing system of the invention.
Figure 8B:
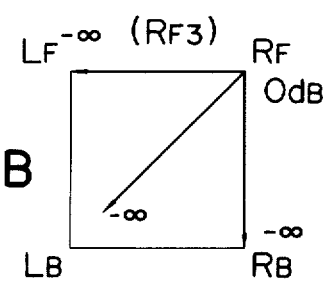
Figure 8C:
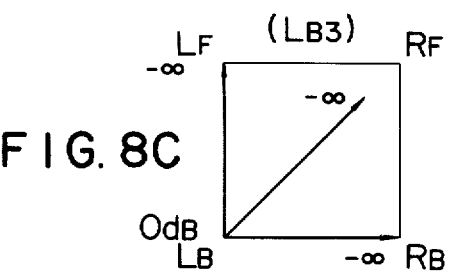
Figure 8D:
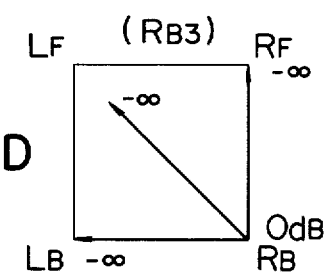

In the matrix four-channel system, as can be noted from the cutting vector diagram shown in FIG. 6, where the same input signal exists at the same time in the four channels, the increase in the amplitude in the horizontal direction of the phonographic record is only about 1.84 time (+5.3 dB). In this case, since the phase difference between first and second signals is equal to 90°, the sound groove cutter moves along a circular path. In other words, the movement of the sound groove cutter will not be so great in the horizontal direction of the phonographic record as the discrete system above-mentioned.

For this reason, by utilizing the left and right signals LT2 and RT2 of the matrix four-channel system as the first and second main signals L and R of the discrete four-channel system, it is possible to lower the peak level of the main signals by about 3.7 dB than the conventional discrete four-channel system thus alleviating the adverse effect upon carrier signals. To reproduce the sound signals by the discrete four-channel syystem, it is necessary to cause the first and second sub-signals to have signal constructions corresponding to those of the main signals.

To accomplish this object, according to this invention, the first and second main signals L and R and the first and second sub-signals A and B are composed as follows.

$$\left.\begin{array}{l} L = LF + jLB + \Delta(RF+jRB), \\ R = RF - jRB + \Delta(LF-jLB), \\ A = LF - jLB - j\Delta RB \text{ and} \\ B = RF + jRB + j\Delta LB \end{array}\right\} \quad (5)$$

Figure 2:
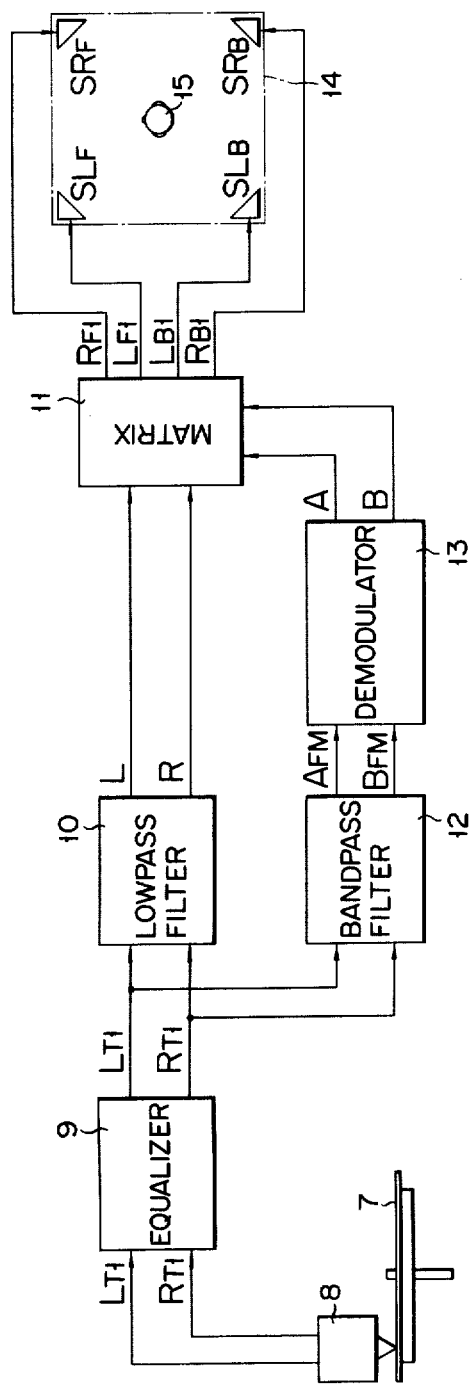
FIG. 2 is a block diagram showing a discrete four-channel sound reproducing system.

When these signals are used, the reproduced output signals produced by the discrete four-channel reproducing system shown in FIG. 2 are expressed by the following equations, respectively.

$$\left.\begin{array}{l} LF1 = L + A = 2LF + \Delta RF \\ RF1 = R + B = 2RF + \Delta LF \\ LB1 = L - A = j2LB + \Delta RF + j\Delta 2RB \\ RB1 = R - B = -j2RB + \Delta LF - j\Delta 2LB \end{array}\right\} \quad (6)$$

As shown by the separation characteristics between these reproduced output signals shown in FIGS. 7A to 7D, even with a conventional discrete four-channel reproducing system it is possible to enjoy four-channel stereo reproduction sufficiently.

More improved separations between channels can be realized by performing simple mathematical operations between signals. First, the following operations are performed for the purpose of making substantially infinity the separation between the left-front channel and the right-front channel.

$$\left.\begin{array}{l} LF3 = LF1 - \dfrac{\Delta}{2} RF1 = 2\left(1 - \dfrac{\Delta^2}{4}\right) LF \\ RF3 = RF1 - \dfrac{\Delta}{2} LF1 = 2\left(1 - \dfrac{\Delta^2}{4}\right) RF \end{array}\right\} \quad (7)$$

Further, for the purpose of making substantially infinity the separation between the left-back channel and the right-front channel as well as the separation between the right-back channel and the left-front channel, the following operations are performed.

$$\left.\begin{array}{l} LB1' = LB1 - \Delta RF = j2LB + j\Delta 2RB \\ RB1' = RB1 - \Delta LF = -j2RB - j\Delta 2LB \end{array}\right\} \quad (8)$$

Similarly, for the purpose of making substantially infinity the separation between the left-back channel and the rightback channel, the following operations are performed.

$$\left.\begin{array}{l} LB3 = LB1' + \Delta RB1' = j2(1-\Delta^2)LB \\ RB3 = RB1' + \Delta LB1' = -j2(1-\Delta^2)RB \end{array}\right\} \quad (9)$$

If these signals LF3, RF3, LB3 and RB3 are used as the four-channel reproduced outputs, it would be possible to make the separations between respective channels substantially infinity as shown by FIGS. 8A to 8D.

Figure 9:
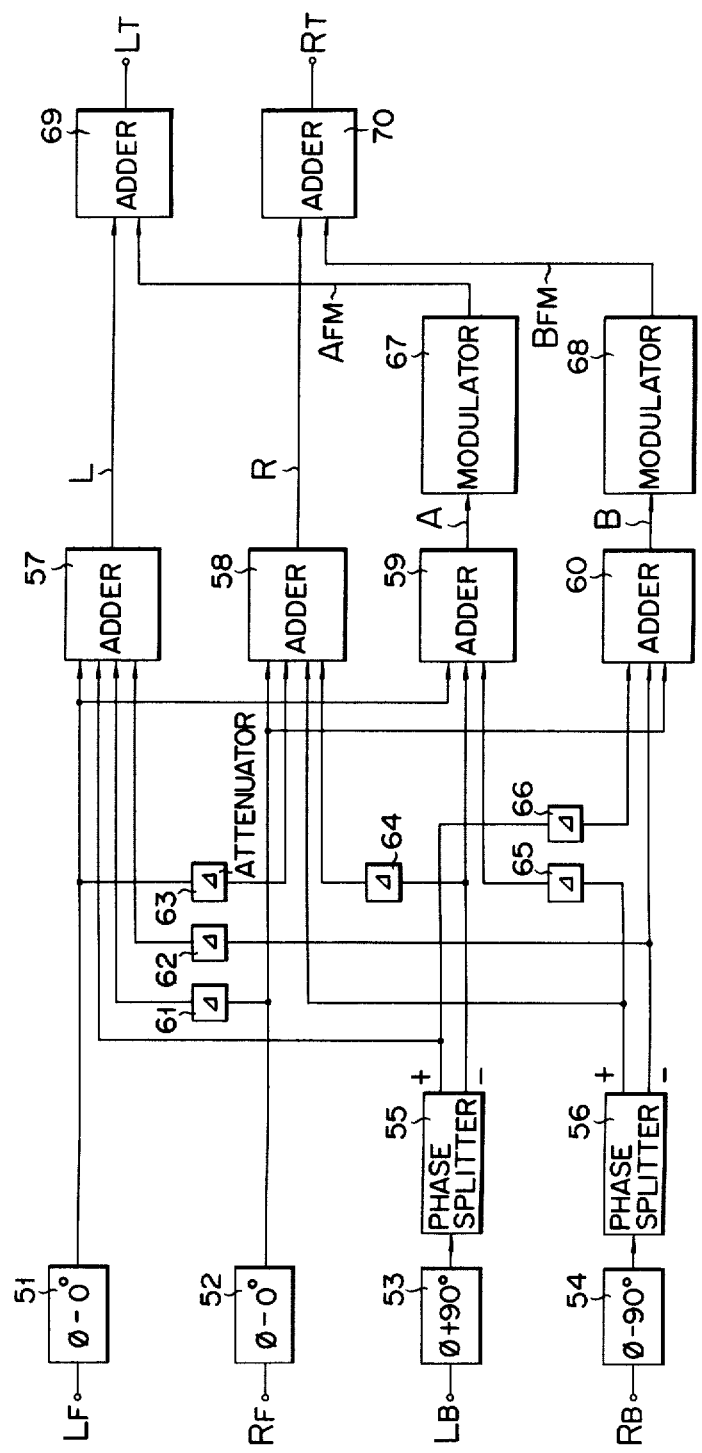
FIG. 9 is a block diagram of one embodiment of this invention for synthesizing first and second recording signals or transmission signals compatible with both of the discrete four-channel system and the matrix four-channel system.

One example of a system for synthesizing the first and second main signals L and R and the first and second subsignals A and B which are expressed by the equation (5) will now be described with reference to the block diagram shown in FIG. 9. More particularly, first and second sound signals LF and RF are applied respectively to phase shifters 51 and 52 having the same phase shifting characteristic over the entire acoustic frequency band, whereas the third and fourth sound signals LB and RB are applied to phase shifters 53 and 54 having phase shifting characteristics of ±90° difference with respect to those of phase shifters 51 and 52 respectively. Accordingly, when the outputs from phase shifters 51 and 52 are denoted by LF and RF, respectively, it can be readily understood that the outputs from phase shifters 53 and 54 are shown by +jLB and −jRB respectively.

The outputs from phase shifters 53 and 54 are applied to phase splitters 55 and 56 respectively.

The output LF from phase shifter 51 and one output +jLB from phase splitter 55 are supplied to a first adder 57 and the output RF from phase shifter 52 and one output +jRB from phase splitter 56 are also supplied to the same adder 57 respectively through attenuators 61 and 62 which multiply the amplitudes of the input signals with Δ. Accordingly, the adder 57 produces the first main signal L expressed by the equation (5). A second adder 58 is supplied with the output RF from the phase shifter 52, the output −jRB from the phase splitter 56, the output LF from the phase shifter 51 and the output −jLB from the phase splitter 55 which have been attenuated by attenuators 63 and 64 respectively, whereby the second main signal R expressed by the equation (5) is produced. A third adder 59 is connected to receive the output LF from the phase shifter 51, the output −jLB from the phase splitter 55 and the output −jRB from the phase splitter 56 which has been attenuated by an attenuator 65 whereby the first sub-signal A expressed by the equation (5) is formed. A fourth adder 60 is connected to receive the output RF from the phase shifter 52, the output +jRB from the phase splitter 56 and the output +jLB from the phase splitter 55 has been attenuated by an attenuator 66, thereby forming the second sub-signal B expressed by the equation (5).

The first sub-signal A is applied to a modulator 67 to frequency modulate a first carrier signal have a frequency in a range of from 30 kHz to 35 kHz. Similarly, the second sub-signal B is supplied to a modulator 68 to frequency modulate a second carrier signal having a frequency in a range of from 30 kHz to 35 kHz. The first main signal L and the frequency modulated first carrier signal AFM are supplied to an adder 69 to form a first recording or transmission signal LT, whereas the second main signal R and the frequency modulated second carrier signal BFM are applied to an adder 70 to form a second recording or transmission signal RT.

A discrete four-channel sound reproducing system for reproducing sound signals from the first and second signals LT and RT synthesized as mentioned above will be described hereunder with reference to the block diagram shown in FIG. 10.

Filters 75 are provided to separately derive out first and second main signals L and R and first and second carrier signals AFM and BFM from the first and second signals LT and RT. The first and second carrier signals AFM and BFM are supplied to demodulators 76 and 77 respectively to demodulate first and second sub-signals A and B, respectively. A first matrix circuit 78 forms a sum signal L + A(LF1) and a second matrix circuit 79 forms a sum signal R + A(RF1). In the same manner, a third matrix circuit 80 forms a difference signal L − A(LB1) and a fourth matrix circuit 81 forms a difference signal R − B(RB1). The outputs from the first to fourth matrix circuits 78, 79, 80 and 81 are applied to the respective base electrodes of transistors 82 to 85. The outputs from transistors 82 and 83 are respectively applied to phase shifters 86 and 87 having the same phase shift characteristics over the entire audio frequency band, whereas the output from transistor 84 is supplied to a phase shifter 88 having a phase shift characteristic of −90° difference with respect to those of phase shifters 86 and 87. The output from transistor 85 is applied to a phase shifter 89 having a phase shift characteristic of +90° difference with respect to those of phase shifters 86 and 87.

A resistor 90 is connected across the emitter electrodes of transistors 82 and 83 to perform the operation expressed by equation (7). Similarly, a resistor 91 connected across the collector electrode of transistor 83 and the base electrode of transistor 84, and a resistor 92 connected across the collector electrode of transistor 82 and the base electrode of transistor 85 perform the operation expressed by equation (8). A resistor 93 connected between the collectors of transistors 84 and 85 performs the operation expressed by the equation (9). In this manner by merely adding four resistors, it is possible to produce perfectly isolated or discrete four reproduced outputs LF3, RF3, LB3 and RB3. It should be understood that phase shifters 86, 87, 88 and 89 are not always necessary.

Figure 4:
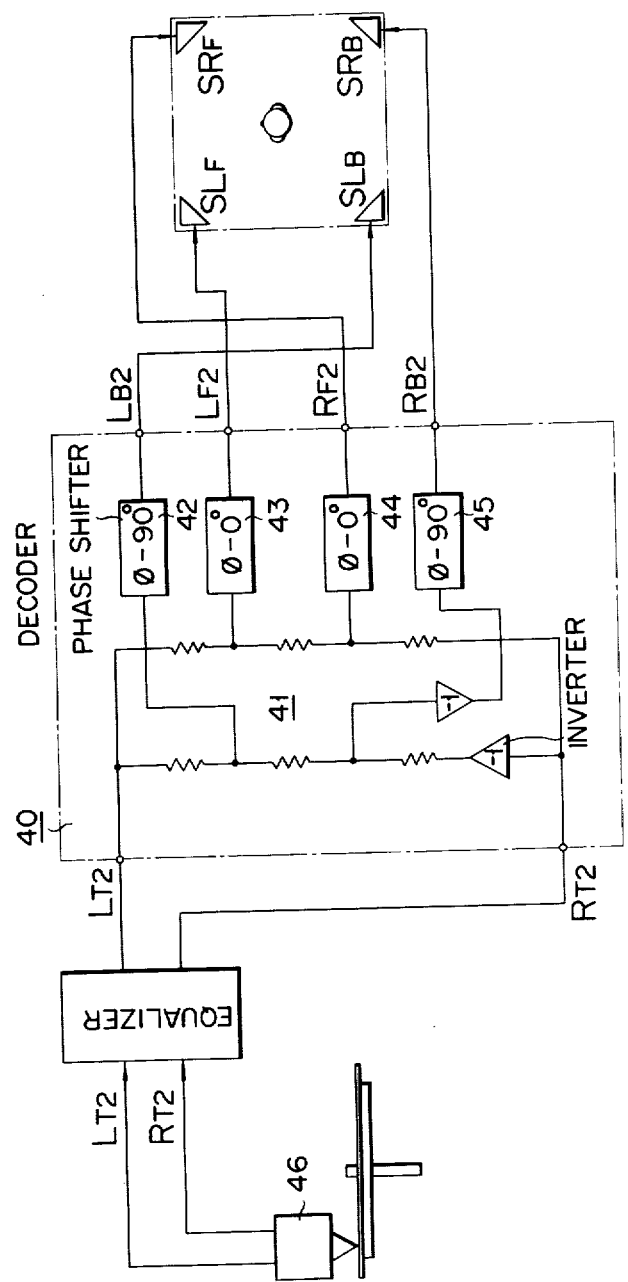
FIG. 4 is a block diagram showing a matrix four-channel sound reproducing system.

In the case of the matrix four-channel sound reproduction, by using the reproducing system shown in FIG. 4, it is possible to provide the four-channel stereo signal reproduction from the reproduced output signals LB2, LF2, RF2 and RB2 in the same manner as in the prior art reproduction system. In the case of the matrix four-channel reproduction, a conventional cartridge having a reproducing capability of from 20 Hz to 20 kHz may be used as the pick-up cartridge 46. Under these conditions, only the first and second main signals L and R are reproduced and supplied to decoder 40.

What we claim is:

1. A signal synthesizing system for forming first and second recording or transmission signals from first, second, third and fourth sound signals LF, RF, LB and RB, said first recording or transmission signal containing a first main signal L and a first sub-signal A, said second recording or transmission signal containing a second main signal R and a second sub-signal B, said first and second main signals being adapted for a matrix four-channel reproduction system, and said first and second main signals and said first and second sub-signals being adapted for a discrete four-channel reproduction system; said synthesizing system comprising:

first means for combining said first sound signal, an amplitude portion of said second sound signal, said third sound signal and an amplitude portion of said fourth sound signal with a predetermined phase relationship therebetween to form said first main signal;

second means for combining an amplitude portion of said first sound signal, said second sound signal, an amplitude portion of said third sound signal, and said fourth sound signal with a predetermined phase relationship therebetween to form said second main signal, said first and second sound signals in said second main signal being in phase with said first and second sound signals in said first main signal, respectively, and said third and fourth sound signals in said second main signal being 180° out of phase with said third and fourth sound signals in said first main signal, respectively;

third means for combining said first sound signal, said third sound signal and an amplitude portion of said fourth sound signal with a predetermined phase relationship therebetween to form said first sub-signal, said first sound signal in said first sub-signal being in phase with said first sound signal in said first main signal, and said third and fourth sound signals in said first sub-signal being 180° out of phase with said third and fourth sound signals in said first main signal, respectively fourth means for combining said second sound signal, an amplitude portion of said third sound signal, and said fourth sound signal with a predetermined phase relationship therebetween to form said second sub-signal, said second sound signal in said second sub-signal being in phase with said second sound signal in said second main signal, and said third and fourth sound signals in said second sub-signal being 180° out of phase with said third and fourth sound signals in said second main signal, respectively;

with said first and second main signals L and R and said first and second sub-signals A and B related to said first to fourth sound signals LF, RF, LB and RB according to the following equations $L = LF + \Delta RF + jLB + J\Delta RB,$
$R = RF + \Delta LF - jRB - j\Delta LB,$
$A = LF - jLB - j\Delta RB$ and
$B = RF + jRB + j\Delta LB$ where $\Delta$ represents a matrix coefficient ranging from 0 to 1;

fifth means for frequency-modulating a first carrier signal in accordance with said first sub-signal;

sixth means for frequency-modulating a second carrier signal in accordance with said second sub-signal;

means for adding said first main signal and the frequency-modulated first carrier signal to produce said first recording or transmission signal; and means for adding said second main signal and the frequency-modulated second carrier signal to produce said second recording or transmission signal.

2. A demodulator for demodulating the first and second recording or transmission signals as defined in claim 1 to reproduce respective sound signals contained in said recording or transmission signals, said demodulator comprising:
  means for independently deriving out said first main signal L, said second main signal R, said first sub-signal A and said second sub-signal B from said first and second recording or transmission signals;
  first means for producing a first sum signal of said first main signal and said first sub-signal;
  second means for producing a second sum signal of said second main signal and said second sub-signal;
  third means for producing a first difference signal of said first main signal and said first sub-signal; and
  fourth means for producing a second difference signal of said second main signal and said second sub-signal.

3. A demodulator according to claim 2 which further comprises means for adding with opposite polarity an amplitude portion of said second sum signal to said first sum signal and means for adding with opposite polarity an amplitude portion of first sum signal to said second sum signal.

4. A demodulator according to claim 2 which further comprises fifth means for adding with opposite polarity an amplitude portion of said second sum signal to said first sum signal and for adding with opposite polarity an amplitude portion of said first sum signal to said second sum signal;
  sixth means for adding with opposite polarity an amplitude portion of the sum of said first sum signal and an amplitude portion of said second sum signal of opposite polarity to said first difference signal; and
  seventh means for adding with opposite polarity an amplitude portion of the sum of said second sum signal and an amplitude portion of said first sum signal of opposite polarity to said second difference signal.

5. A demodulator according to claim 4 which further comprises means for adding the output of said sixth means to an amplitude portion of the output of said seventh means and for adding the output of said seventh means to an amplitude portion of the output of said sixth means.

* * * * *